United States Patent
Almog et al.

(10) Patent No.: US 9,706,017 B2
(45) Date of Patent: Jul. 11, 2017

(54) ATOMIC UPDATE OF PACKET CLASSIFICATION RULES

(71) Applicant: Mellanox Technologies TLV Ltd., Ra'anana (IL)

(72) Inventors: Ariel Almog, Kochav Yair (IL); Aviv Kfir, Nili (IL); David Mozes, Yokneam Moshava (IL); Barak Gafni, Kfar Malal (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 111 days.

(21) Appl. No.: 14/868,405

(22) Filed: Sep. 29, 2015

(65) Prior Publication Data

US 2017/0094036 A1    Mar. 30, 2017

(51) Int. Cl.
*H04L 29/06* (2006.01)
*H04L 12/743* (2013.01)

(52) U.S. Cl.
CPC .......... *H04L 69/22* (2013.01); *H04L 45/7457* (2013.01)

(58) Field of Classification Search
CPC .......... H04L 12/56; H04L 45/74; H04L 47/24
See application file for complete search history.

(56) References Cited

U.S. PATENT DOCUMENTS

| 8,462,786 B2 | 6/2013 | Liu et al. | |
| 2008/0192754 A1* | 8/2008 | Ku | H04L 45/00 370/395.32 |
| 2015/0201047 A1* | 7/2015 | Goyal | H04L 47/2441 706/61 |
| 2015/0242429 A1* | 8/2015 | Varvello | H04L 45/7453 707/752 |
| 2017/0052731 A1* | 2/2017 | Levy | G06F 3/0638 |

OTHER PUBLICATIONS

CISCO—"Configuring IP ACL's", Cisco Nexus 7000 Series NX-OS Security Configuration Guide, Release 6.x, 56 pages, Jan. 20, 2015.
Openflow—OpenFlow Switch Specification, Open Networking Foundation, version 1.4.0, 206 pages (relevant chapter—section 6.8.1), Oct. 14, 2013.

* cited by examiner

*Primary Examiner* — Lakeram Jangbahadur
(74) *Attorney, Agent, or Firm* — D.Kligler IP Services Ltd.

(57) ABSTRACT

A method for classification includes storing in a TCAM classification rules comprising respective tags, each including an update bit. Data items are classified by extracting a respective key from each data item, appending an update-select bit to construct an extended key, and matching the extended key to one of the tags in the TCAM. In response to an instruction to atomically replace a group of existing rules in the TCAM with new rules, the update bit is unmasked and set to the first bit value in the group of the existing rules. The new rules are stored in the TCAM, with their update bit set to a second bit value. After storing the new rules in the TCAM, the update-select bit in the extended key of the received data items is set to the second bit value.

10 Claims, 2 Drawing Sheets

ATOMIC UPDATE OF PACKET CLASSIFICATION RULES

FIELD OF THE INVENTION

The present invention relates generally to packet network communications, and particularly to methods and apparatus for handling of packet flows in a network.

BACKGROUND

Packet-transfer devices in high-speed data networks, such as switches and routers, are required to perform flexible and sophisticated packet classification at high speed. For this purpose, many switches and routers use ternary content-addressable memory (TCAM) components to store rules that are to be applied in processing packets. To search the TCAM, several fields of the packet (typically header fields) are concatenated to form a key. A match between the key and a given TCAM entry can be used to trigger various actions for application by the network device, such as forwarding decisions, packet encapsulation and de-capsulation, security filtering, and quality of service classification.

TCAM is advantageous in that it is able to hold search entries that contain not only ones and zeroes, to be matched against the key, but also "don't care" bits, which will match either a zero or a one in the key. These "don't care" bits in the TCAM entries are commonly referred to as "masked" bits, while bits having a defined value (1 or 0) are referred to as "unmasked." TCAM thus affords a high degree of flexibility in rule definition.

U.S. Pat. No. 8,462,786 describes a method for TCAM-based packet classification using multiple lookups and classifier semantics. The method includes: receiving a set of rules for packet classification, where a rule sets forth values for fields in a data packet and a decision for data packets having matching field values. Packet classification rules periodically need to be updated. According to the inventors, the common practice for updating rules is to run two TCAMs in tandem where one TCAM is used while the other is updated.

SUMMARY

Embodiments of the present invention that are described hereinbelow provide methods that enable atomic updates to groups of classification rules, as well as classification apparatus implementing such methods.

There is therefore provided, in accordance with an embodiment of the invention, a method for classification, which includes storing in a ternary content-addressable memory (TCAM) a plurality of classification rules including respective tags. Each tag includes a string of maskable bits, including an update bit. Data items are received and classified according to the classification rules by extracting a respective key from each data item, appending an update-select bit to the extracted key, thereby constructing an extended key, and matching the extended key to one of the tags in the TCAM. In a default classification state, the update bit is masked in all of the classification rules, and the update-select bit in the extended key of all the received data items is set to a first bit value.

In response to an instruction to atomically replace a group of existing rules in the TCAM with new rules, the update bit in the group of the existing rules is unmasked, while being set to the first bit value. The new rules are stored in the TCAM, with the update bit in the new rules set to a second bit value, different from the first bit value, and unmasked. After storing the new rules in the TCAM, the update-select bit in the extended key of the received data items is set to the second bit value.

In some embodiments, the method includes, after storing the new rules, deleting the group of the existing rules from the TCAM while continuing to set the update-select bit in the extended key of the received data items to the second bit value. Typically, the method includes, after deleting the group of the existing rules, reverting to the default classification state. Additionally or alternatively, in the existing rules that are outside the group that is to be replaced, the update bit continues to be masked while replacing the rules in the group, whereby the existing rules outside the group are unaffected by setting the update-select bit.

In some embodiments, receiving the data items includes receiving data packets from a network, and extracting the respective key includes extracting a string of bits from selected fields in the data packets. Typically, classifying the data items includes looking up, responsively to a classification rule that contains the one of the tags that matched the extended key for each data packet received from the network, an action to be applied to the data packet, and applying the action to the data packet. In a disclosed embodiment, receiving the data packets includes receiving flows of the data packets in a network switching element, which contains the TCAM and which applies respective actions to the flows in accordance with the classification rules.

There is also provided, in accordance with an embodiment of the invention, classification apparatus, including a ternary content-addressable memory (TCAM) in a network element a plurality of classification rules including respective tags. Each tag includes a string of maskable bits, including an update bit, which in a default classification state is masked in all of the classification rules. Decision logic is configured to receive and classify data items according to the classification rules by extracting a respective key from each data item, appending to the extracted key an update-select bit, which in the default classification state is set to the first bit value, thereby constructing an extended key, and matching the extended key to one of the tags in the TCAM. The decision logic is configured to atomically replace a group of existing rules in the TCAM with new rules in accordance with the procedure described above.

The present invention will be more fully understood from the following detailed description of the embodiments thereof, taken together with the drawings in which:

DETAILED DESCRIPTION OF EMBODIMENTS

Figure 1:
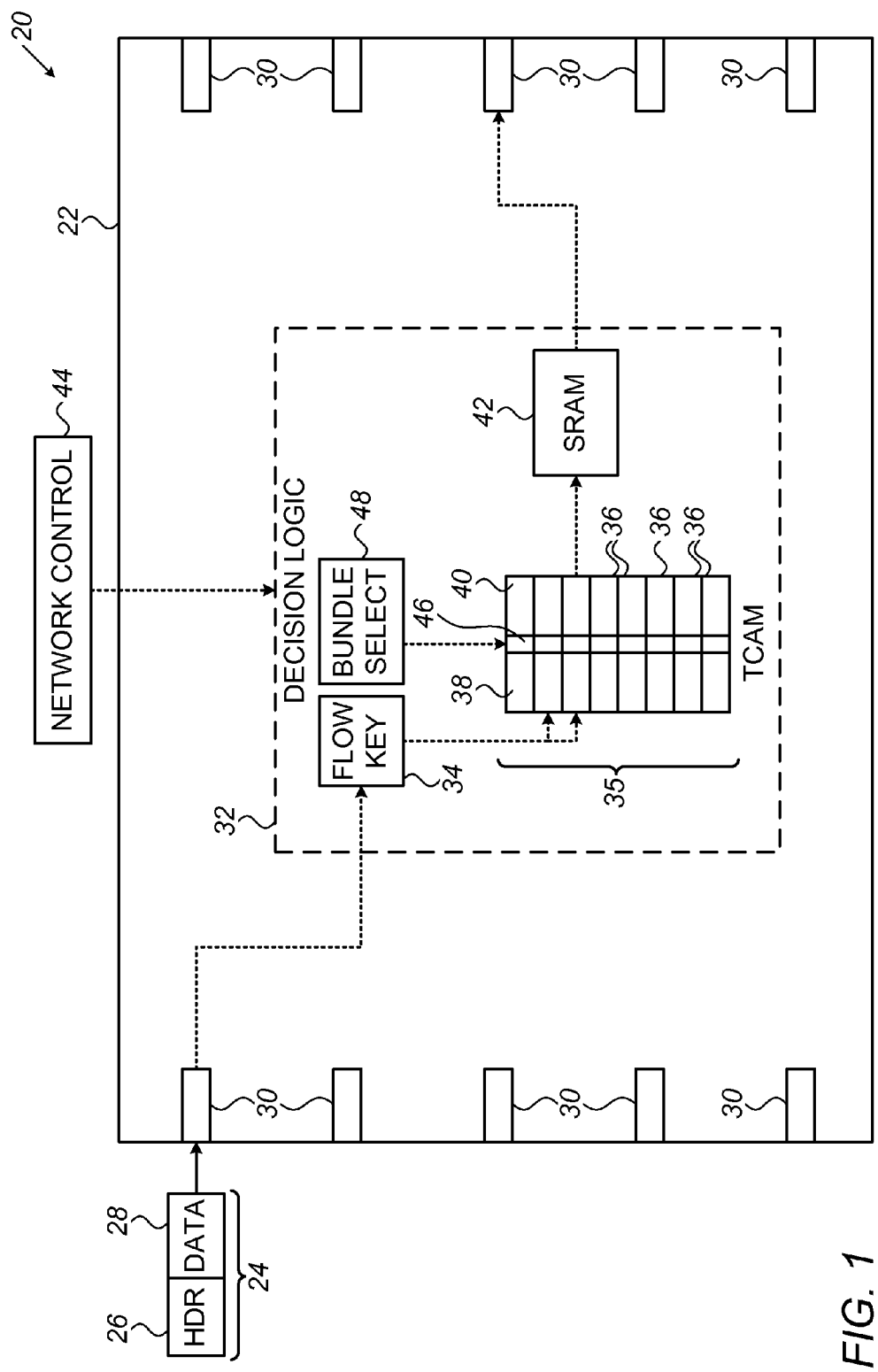
FIG. 1 is a block diagram that schematically illustrates packet classification apparatus, in accordance with an embodiment of the invention.

Updating a group of classification rules that are stored in TCAM can take time, because it is generally possible to write entries to a TCAM device only one by one. In some network management scenarios, however, the demand arises to update an entire group of classification rules atomically, meaning that all the updated rules are activated at once, between processing one data packet and the next.

For example, the OpenFlow Switch Specification (Version 1.4.0, promulgated by the Open Networking Foundation, October, 2013), section 6.8.1, defines a "bundle" as "a sequence of OpenFlow modification requests from [a] controller that is applied as a single OpenFlow operation . . . , so that all changes are applied together or that none of them is applied." Section 6.8.4 goes on to define "bundle atomic modifications," in which "a controller querying the switch must never see the intermediate state, it must see either the state of the switch with none or with all of the modifications contained in the bundle having been applied."

Embodiments of the present invention that are described herein provide techniques and apparatus that enable atomic updates of groups of classification rules in TCAM. These techniques are efficient in terms of the resources, in TCAM and supporting logic, that are required for implementation. They are particularly (but not exclusively) useful in applications in which multiple flows, such as video streams, for example, are shifted simultaneously from one network route to another. Although the embodiments shown in the figures and described below in detail relate specifically to classification of data packets in a network element, the principles of the present invention are similarly applicable to classifying other sorts of data items using rules stored in TCAM. Furthermore, although the disclosed embodiments relate to atomic updates performed in a single network element, these techniques may readily be extended to synchronized atomic updates over multiple network elements without loss of traffic.

In the disclosed embodiments, classification rules are stored in TCAM. Each rule comprises a respective tag, which comprises a string of maskable bits, including an update bit, which is used in implementing atomic updates. A classifier, such as decision logic in a switch or other network element, receives and classifies data items according to the classification rules by extracting a respective key from each data item, appending an update-select bit to the extracted key, and matching the resulting extended key to one of the tags in the TCAM. Between updates, the classifier remains in its default classification state. In this state, the update bit in all of the classification rules is masked, and the update-select bit in the extended key of all the received data items is set to a first, default bit value (for example, zero).

Upon receiving an instruction to atomically replace a group of existing rules in the TCAM with new rules, the classifier takes the following steps: In the existing rules in the group, it unmasks the update bit, which is set to the first, default bit value (either at the time of unmasking or having been set previously). The classifier stores the new rules in the TCAM, with the update bit in the new rules set to a different, second bit value (for example, one), also unmasked. As long as classifier continues to set the update-select bit to the first bit value, the old rules will be chosen and the new rules ignored. After storing the new rules in the TCAM has been completed, however, the classifier sets the update-select bit in the extended key of the received data items to the second bit value, thus putting the group of new rules into effect atomically. This entire process of atomic update requires no more than a single bank of TCAM.

After storing and activating the new rules, the classifier can delete the group of old rules from the TCAM. During this clean-up process, the classifier continues to set the update-select bit in the extended key of the received data items to the second bit value. Finally, after deleting the old rules, the classifier can revert to the default classification state, in which the update bit in all of the classification rules is masked, and the update-select bit in the extended key of all the received data items is set to the first, default bit value, until it is time for the next update.

FIG. 1 is a block diagram that schematically illustrates packet classification apparatus 20, comprising a network element 22, in accordance with an embodiment of the invention. In the present embodiment, network element 22 is configured as a network switch or router, for example, with multiple ports 30 connected to a packet communication network. Decision logic 32 within element 22 applies classification rules in forwarding data packets 24 between ports 30, and possibly, additionally or alternatively, in performing other actions, such as access control, encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 32.

In the pictured embodiment, decision logic 24 receives packet 24 containing a header 26 and payload data 28. A processing pipeline 34 in decision logic 32 extracts a flow classification key from each packet 24, typically (although not necessarily) including the contents of certain fields of header 26. For example, the key may comprise the source and destination addresses and ports and a protocol identifier. A bundle update selector 48 appends an update-select bit to each key, thus providing an extended key for purposes of atomic updates, as explained above. Such updates are typically dictated to network element 22 by a network controller 44, such as a computer with a suitable interface and software, which communicates with network element 22 either via the network or over an out-of-band connection. Update instructions may be transmitted in accordance with the above-mentioned OpenFlow protocol or any other suitable protocol that is known in the art.

Pipeline 34 matches the extended key against a set of rule entries 36, which are stored in a TCAM 35 in network element 22. Each rule entry 36 comprises a tag 38, which comprises a string of maskable bits, including an update bit 46. Each rule entry indicates the particular action that logic 32 is to apply to packet 24 in case of a match, typically in the form of a pointer 40 to an address in a list of actions that is stored, for example, in a static read-only memory (SRAM) 42. As noted earlier, actions carried out by decision logic 32 based on these rules typically include forwarding decisions, and may also include implementation of access control lists, packet encapsulation and de-capsulation, and/or other sorts of security filtering and quality of service classification, for example.

Decision logic 32 typically comprises dedicated or programmable hardware logic, which is configured to carry out the functions described herein. For example, decision logic 32 may comprise a suitable application-specific integrated circuit (ASIC). Alternatively or additionally, at least some of the functions of decision logic 32 may be implemented in a standalone or embedded microprocessor, performing its functions under the control of software instructions, which are typically stored in tangible, non-transitory computer-readable storage media, such as electronic, optical, or magnetic memory media.

Figure 2:
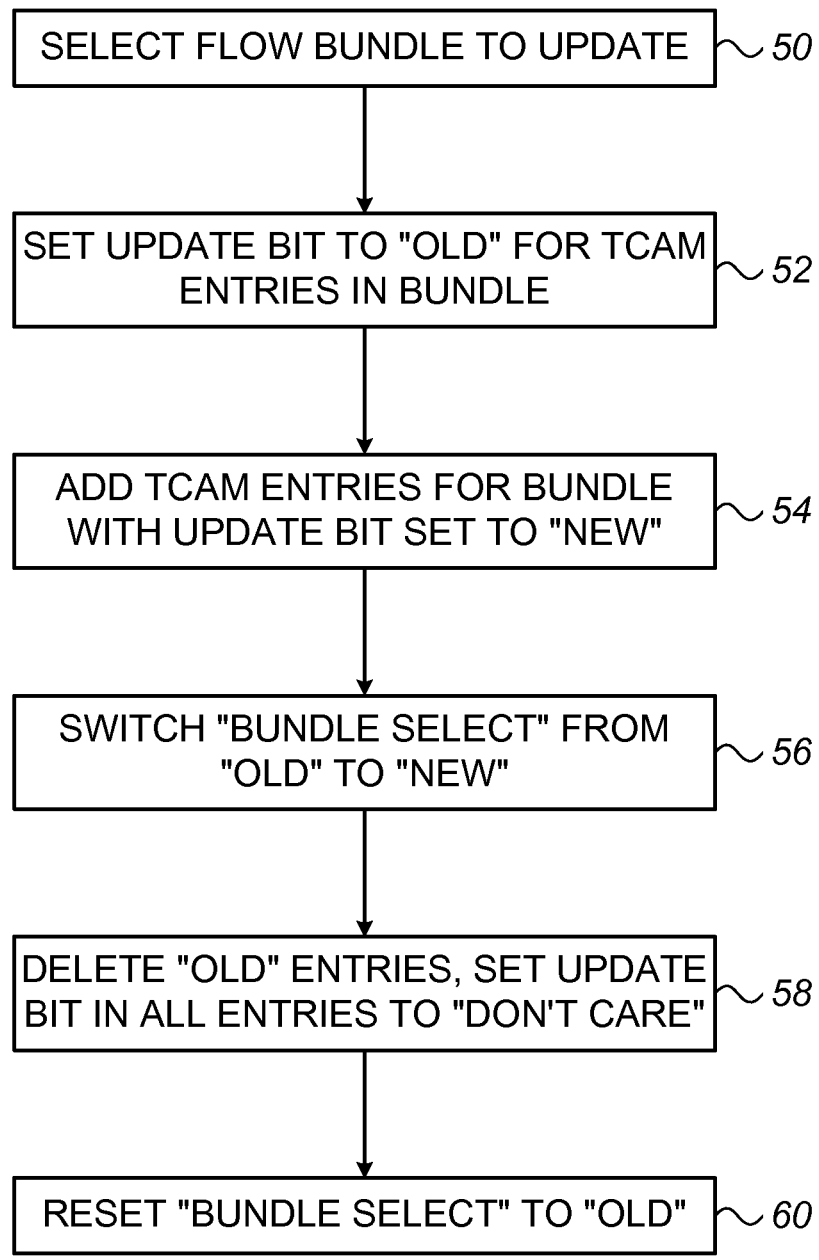
FIG. 2 is a flow chart that schematically illustrates a method for updating packet classification rules, in accordance with an embodiment of the invention.

FIG. 2 is a flow chart that schematically illustrates a method for updating flow control rules, in accordance with an embodiment of the invention. The method is described hereinbelow, for the sake of clarity and concreteness, with reference to classification of data packets in apparatus 20. The principles of this method may alternatively be applied, mutatis mutandis, in classifying and handling other sorts of data items using rules stored in TCAM.

Prior to beginning an update, decision logic 32 operates in its default state, in which the list of rule entries 36 in TCAM 35 and their status are shown in Table I below. In this table, as well as in the other tables that follow, masked bits are marked "*". The values of tags 38 are arbitrary (except for the values of update bit 46), and are listed solely for the sake of illustration, while the "ID" and "In use?" values are listed for ease of explanation in identifying packet flows and the corresponding rule status, and do not generally correspond to actual fields in the TCAM entries.

TABLE I

TCAM RULES - DEFAULT STATE

| ID | Tag | Update bit | In use? |
| --- | --- | --- | --- |
| 1 | 1000101* | * | Yes |
| 2 | 11**0010 | * | Yes |
| 3 | 00011**11010 | * | Yes |
| 4 | 0000***1 | * | Yes |
| 5 | ... | * | Yes |

In the description that follows, the bit value "0" will be used, for the sake of clarity, as the default (old) state of update bit 46, while "1" will indicate new entries 36; but this choice is arbitrary, and the bit values could equally well be reversed. Furthermore, although a single, maskable update bit 46 in tags 38 and a single, corresponding update-select bit in the extended key are sufficient for implementation of the disclosed embodiments, a string of two or more bits may alternatively be used for this purpose. The term "bit," as used in the present description and in the claims in reference to update status indicators, should therefore be understood as non-limiting and includes such multi-bit implementations within its scope.

Controller 44 selects a bundle of flows to update, and sends instructions to network element 22 to update these flows, at a flow selection step 50. In the present example, it will be assumed that the flows identified by IDs 2 and 4 are chosen for update. Decision logic 32 sets the value of update bit 46 in these existing entries 36 to zero (if not set previously) and unmasks these update bits, at an update bit setting step 52. The decision logic also adds the new, replacement entries 36 for flows 2 and 4 to TCAM 35, at a new entry writing step 54. Update bit 46 in these new entries is set to one. Meanwhile, bundle update selector 48 continues to append an update-select bit value of zero to the keys of the incoming packets that are processed by decision logic 32.

At this stage, the list of entries 36 in TCAM 35 will have the following form, with the new rules marked as "2a" and "4a":

TABLE II

TCAM RULES - PREPARING FOR UPDATE

| ID | Tag | Update bit | In use? |
| --- | --- | --- | --- |
| 1 | 1000101* | * | Yes |
| 2 | 11**0010 | 0 | Yes |
| 2a | 11**0010 | 1 | No |
| 3 | 00011**11010 | * | Yes |
| 4 | 0000***1 | 0 | Yes |
| 4a | 0000***1 | 1 | No |
| 5 | ... | * | Yes |

For the sake of simplicity, new rules 2a and 4a have the same tags as the old rules 2 and 4 that they are to replace. Alternatively, however, at least some of the new rules may have different tags from the old rules. Note also that in the rules that are not to be replaced (rules 1 and 3 in the example above), the update bit remains masked.

Once all of the new rules have been written to TCAM 35, bundle update selector 48 effectuates an atomic switchover to the new rules by appending an update-select bit value of one to the keys of all incoming packets, at a new bundle selection step 56. There is no change to the list of entries 36 in TCAM 35 at this step, but the status of all the affected rules changes instantly, as illustrated in Table III below. Because the update bit in the rules outside the group that is being replaced continues to be masked, these rules are unaffected by the change in the setting of the update-select bit.

TABLE III

TCAM RULES - UPDATE IN EFFECT

| ID | Tag | Update bit | In use? |
| --- | --- | --- | --- |
| 1 | 1000101* | * | Yes |
| 2 | 11**0010 | 0 | No |
| 2a | 11**0010 | 1 | Yes |
| 3 | 00011**11010 | * | Yes |
| 4 | 0000***1 | 0 | No |
| 4a | 0000***1 | 1 | Yes |
| 5 | ... | * | Yes |

After the switchover has been completed, decision logic 32 cleans up TCAM 35 by deleting old entries 36 that are no longer in use, at a cleanup step 58. Once the cleanup is done, update bit 46 in all entries can once again be masked. The result is shown in Table IV:

TABLE IV

TCAM RULES - POST-UPDATE

| ID | Tag | Update bit | In use? |
| --- | --- | --- | --- |
| 1 | 1000101* | * | Yes |
| 2a | 11**0010 | * | Yes |
| 3 | 00011**11010 | * | Yes |
| 4a | 0000***1 | * | Yes |
| 5 | ... | * | Yes |

Bundle update selector 48 returns decision logic 32 to its default classification state by appending an update-select bit value of zero to the keys of all incoming packets, at a bundle reset step 60. At this point, network element 22 continues its normal, default mode of operation until the next update instruction from controller 44.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method performed by a network apparatus for classification, comprising:

storing in a ternary content-addressable memory (TCAM) a plurality of classification rules comprising respective tags, each tag comprising a string of maskable bits, including an update bit;

receiving and classifying data items according to the classification rules by extracting a respective key from each data item, appending an update-select bit to the extracted key, thereby constructing an extended key, and matching the extended key to one of the tags in the TCAM, wherein receiving the data items comprises receiving data packets from a network, and wherein extracting the respective key comprises extracting a string of bits from selected fields in the data packets, and wherein classifying the data items comprises looking up, responsively to a classification rule that contains the one of the tags that matched the extended key for each data packet received from the network, an action to be applied to the data packet, and applying the action to the data packet;

in a default classification state, masking the update bit in all of the classification rules and setting the update-select bit in the extended key of all the received data items to a first bit value; and in response to an instruction to atomically replace a group of existing rules in the TCAM with new rules:
  in the group of the existing rules, unmasking the update bit, which is set to the first bit value;
  storing the new rules in the TCAM, with the update bit in the new rules set to a second bit value, different from the first bit value, and unmasked; and
  after storing the new rules in the TCAM, setting the update-select bit in the extended key of the received data items to the second bit value.

2. The method according to claim 1, and comprising, after storing the new rules, deleting the group of the existing rules from the TCAM while continuing to set the update-select bit in the extended key of the received data items to the second bit value.

3. The method according to claim 2, and comprising, after deleting the group of the existing rules, reverting to the default classification state.

4. The method according to claim 1, and comprising, in the existing rules that are outside the group that is to be replaced, continuing to mask the update bit while replacing the rules in the group, whereby the existing rules outside the group are unaffected by setting the update-select bit.

5. The method according to claim 1, wherein receiving the data packets comprises receiving flows of the data packets in a network element, which contains the TCAM and which applies respective actions to the flows in accordance with the classification rules.

6. A network classification apparatus, comprising:
  a ternary content-addressable memory (TCAM) in a network element, which is configure to store a plurality of classification rules comprising respective tags, each tag comprising a string of maskable bits, including an update bit, which in a default classification state is masked in all of the classification rules; and
  a decision logic processor, which is configured to receive and classify data items according to the classification rules by extracting a respective key from each data item, appending to the extracted key an update-select bit, which in the default classification state is set to a first bit value, thereby constructing an extended key, and matching the extended key to one of the tags in the TCAM,
  wherein the data items comprise data packets received from a network, and wherein the extracted key comprises a string of bits extracted from selected fields in the data packets, and
  wherein the decision logic processor is configured to look up, responsively to a classification rule that contains the one of the tags that matched the extended key for each data packet received from the network, an action to be applied to the data packet, and to apply the action to the data packet, and
  wherein the decision logic processor is configured to receive an instruction to atomically replace a group of existing rules in the TCAM with new rules, and to carry out the instruction by:
    in the group of the existing rules, unmasking the update bit, which is set to the first bit value;
    storing the new rules in the TCAM, with the update bit in the new rules set to a second bit value, different from the first bit value, and unmasked; and
    after storing the new rules in the TCAM, setting the update-select bit in the extended key of the received data items to the second bit value.

7. The network classification apparatus according to claim 6, wherein the decision logic processor is configured, after storing the new rules, to delete the group of the existing rules from the TCAM while continuing to set the update-select bit in the extended key of the received data items to the second bit value.

8. The network classification apparatus according to claim 7, wherein the decision logic processor is configured, after deleting the group of the existing rules, to revert to the default classification state.

9. The network classification apparatus according to claim 6, wherein in the existing rules that are outside the group that is to be replaced, the update bit continues to be masked during replacement of the rules in the group, whereby the existing rules outside the group are unaffected by setting the update-select bit.

10. The network classification apparatus according to claim 6, wherein the TCAM and the decision logic processor are comprised in the network element, which is configured to receive flows of the data packets and to apply respective actions to the flows in accordance with the classification rules.

* * * * *